(12) United States Patent
Plickert et al.

(10) Patent No.: US 6,999,661 B2
(45) Date of Patent: Feb. 14, 2006

(54) CONFIGURATION FOR COUPLING OPTICAL SIGNALS OF AT LEAST ONE OPTICAL DATA CHANNEL INTO AND/OR OUT OF AN OPTICAL WAVEGUIDE

(75) Inventors: Volker Plickert, Brieselang (DE); Lutz Melchior, Berlin (DE); Thomas Murphy, Berlin (DE); Herwig Stange, Berlin (DE)

(73) Assignee: Infineon Technologies AG, Munich (DE)

( * ) Notice: Subject to any disclaimer, the term of this patent is extended or adjusted under 35 U.S.C. 154(b) by 20 days.

(21) Appl. No.: 10/339,233

(22) Filed: Jan. 9, 2003

(65) Prior Publication Data

US 2003/0138198 A1 Jul. 24, 2003

(30) Foreign Application Priority Data

Jan. 9, 2002 (DE) ................................ 102 01 127

(51) Int. Cl.
*G02B 6/26* (2006.01)
(52) U.S. Cl. ............................. 385/38; 385/27; 385/50
(58) Field of Classification Search ................. 385/31, 385/38, 50, 53–55, 70–73, 88, 89
See application file for complete search history.

(56) References Cited

U.S. PATENT DOCUMENTS

| 4,339,170 | A | * | 7/1982 | Winzer ........................ 385/24 |
| 4,767,171 | A | | 8/1988 | Keil et al. |
| 5,129,022 | A | * | 7/1992 | Marcus ........................ 385/47 |
| 5,239,604 | A | * | 8/1993 | Ziebol et al. ................. 385/84 |
| 5,390,266 | A | * | 2/1995 | Heitmann et al. ............ 385/44 |
| 5,499,309 | A | * | 3/1996 | Kozuka et al. ............... 385/38 |
| 6,280,099 | B1 | * | 8/2001 | Wu ............................. 385/73 |
| 6,404,953 | B1 | * | 6/2002 | Wach et al. .................. 385/31 |
| 6,414,779 | B1 | * | 7/2002 | Mandella et al. ........... 359/212 |

FOREIGN PATENT DOCUMENTS

| DE | 28 51 625 C2 | 6/1980 |
| EP | 0 238 977 B1 | 9/1987 |
| EP | 0 646 812 A1 | 4/1995 |

* cited by examiner

*Primary Examiner*—Juliana Kang
(74) *Attorney, Agent, or Firm*—Laurence A. Greenberg; Werner H. Stemer; Ralph E. Locher (57) ABSTRACT

A configuration for coupling optical signals of at least one optical data channel into and/or out of an optical waveguide carrying optical signals of at least two optical data channels includes at least two optical waveguide sections forming the optical waveguide, the sections positioned axially one behind the other, at least core regions of two optical waveguide sections being positioned one behind the other separated from one another by a free-radiating region, an end face of at least one waveguide section running obliquely with respect to an optical axis (7) of the waveguide and being coated with a wavelength-selective filter, and, for a specific optical data channel, light being coupled into or out of the optical waveguide by reflecting light of the optical data channel, before or after traversing the free-radiating region, at the end face of the optical waveguide section running obliquely with respect to the optical axis.

32 Claims, 8 Drawing Sheets

CONFIGURATION FOR COUPLING OPTICAL SIGNALS OF AT LEAST ONE OPTICAL DATA CHANNEL INTO AND/OR OUT OF AN OPTICAL WAVEGUIDE

BACKGROUND OF THE INVENTION

Field of the Invention

The invention relates to a configuration for coupling optical signals of at least one optical channel into and/or out of an optical waveguide that carries optical signals of at least two optical data channels, and to an electro-optical module having such a configuration.

Wavelength division multiplex methods exist in which light signals of a plurality of wavelengths are transmitted simultaneously on an optical fiber. The coupling of the signals of a plurality of wavelengths or optical data channels into and/or out of an optical fiber is effected in electro-optical modules having a plurality of transmitting and/or receiving components, the signals of the individual wavelengths being combined or separated in the modules.

European Patent Application 238 977 corresponding to U.S. Pat. No. 4,767,171 to Keil et al., discloses an electro-optical transmitting and receiving module for a bi-directional communications network, in which spherical lenses are disposed at a distance from one another between a laser diode and an optical fiber end, which lenses focus the laser light onto the fiber end. A wavelength-selective beam splitter is disposed between the spherical lenses for the purpose of wavelength separation, which beam splitter separates light that is radiated from the fiber end and has a wavelength that differs from the wavelength of the laser light from the beam path and conducts it to a detector or receiving component.

The prior art module requires a hermetic encapsulation of the module to prevent condensation on the spherical lenses and wavelength-selective filters. Furthermore, the prior art module must be highly mechanically stable and insensitive to temperature fluctuations to ensure that the laser light is reliably coupled into the optical fiber. Finally, it is to be regarded as a disadvantage of the prior art module that electrical contact connection has to be effected at two different sides of the module, which causes an increased mounting outlay for the user.

SUMMARY OF THE INVENTION

It is accordingly an object of the invention to provide a configuration for coupling optical signals of at least one optical channel into and/or out of an optical waveguide that carries optical signals of at least two optical data channels, and to an electro-optical module having such a configuration that overcome the hereinafore-mentioned disadvantages of the heretofore-known devices of this general type and that is of simple, compact and modular construction, enables optical signals to be coupled in and out with a low channel separation, and, at the same time, operates as far as possible independently of the polarization of the light.

With the foregoing and other objects in view, there is provided, in accordance with the invention, a configuration for coupling optical signals of at least one optical data channel at least one of into and out of an optical waveguide carrying optical signals of at least two optical data channels, including at least two optical waveguide sections disposed axially one behind another along an optical axis, the at least two optical waveguide sections each having core regions disposed one behind another with respect to the optical axis and separated from one another on the optical axis by a free-radiating region, and at least one of the at least two optical waveguide sections having an end face running obliquely with respect to the optical axis, the end face being coated with a wavelength-selective filter and reflecting light for a given optical data channel one of before and after traversing the free-radiating region to thereby couple the light of the given optical data channel at least one of into and out of the at least one optical waveguide section.

Accordingly, the configuration according to the invention is distinguished by the fact that the optical waveguide forms at least two optical waveguide sections, the optical waveguide sections are positioned axially one behind the other, at least the core regions of two optical waveguide sections positioned one behind the other are separated from one another by a free-radiating region, the end face of at least one optical waveguide section runs obliquely with respect to the optical axis of the optical waveguide, the end face of at least one optical waveguide section is coated with a wavelength-selective filter, and, for a specific optical data channel, light is coupled into or out of the optical waveguide by light of the optical data channel being reflected, before or after traversing the free-radiating region, at the end face of an optical waveguide section that runs obliquely with respect to the optical axis of the optical waveguide.

The solution according to the invention provides a construction concept based on the use of a kind of optical "T piece," in which the horizontal "T bar" is realized by optical waveguide sections that adjoin one another. Lateral or transverse coupling of light out of/into the optical waveguide is realized by beveled end faces of optical waveguide sections, at which the light is radiated or coupled in transversely. Such an end face can in each case be associated with a transmitting or receiving component disposed substantially perpendicularly to the optical axis of the optical waveguide. The optical coupling is effected such that the light that is deflected at a beveled end face and, if appropriate reflected at further areas, passes through the cladding of the optical waveguide section (and also adjoining materials) and, then, couples in a substantially free-radiating manner to the optically active region of the transmitting or receiving component, or vice-versa.

The invention provides closed wave-guiding (except for the free-radiating region between two waveguide sections) in a transparent medium, the wave-guiding being highly stable with respect to thermal and mechanical loading on account of the substantially closed wave-guiding and the absence of error-amplifying optics. A further advantage is that wavelength-selective elements that are to be mounted separately are not necessary because the end faces of the optical waveguide sections serve as carriers of these wavelength-selective elements.

By forming a—although, preferably, very small—free-radiating region between the end faces of adjoining optical waveguide sections, at least one of which has a beveled end face, it is possible even for wavelengths that are relatively close together to be separated from one another with little dependence on the direction of polarization by a wavelength-selective filter. This is connected with the fact that the closer together the refractive indices of media that meet one another, the lower the selectivity of the wavelengths from one another and the greater the polarization dependence. A free-radiating region, i.e., a region in which the light radiates through an air gap, provides a maximum separation of the refractive indices of the adjoining media (air/glass or glass/air).

In accordance with another feature of the invention, the free-radiating region is provided by a wedge-shaped air gap between the end faces of the adjoining optical waveguide sections. To produce the wedge-shaped air gap, preferably, the end face of the optical waveguide section from which light that is to be coupled out emerges is oriented at least partly perpendicularly to the optical axis of the optical waveguide. By contrast, the end face of the optical waveguide section at which light that is to be coupled out is reflected runs obliquely with respect to the optical axis of the optical waveguide, in particular, at an angle of between approximately 60° to 67.5°. Consequently, a wedge-shaped gap is necessarily produced as free-radiating region between the two end faces.

Disposing the end face of the optical waveguide section from which light that is to be coupled out emerges perpendicularly to the optical axis of the optical waveguide advantageously ensures that the light is radiated from the end face coaxially with respect to the optical axis and, consequently, total reflection cannot occur during the radiation. It generally holds true in this case that, if no filter is disposed on the light exit face, as is preferably the case, total reflection occurs at the glass to air interface starting from an angle of impingement of 50° (measured with respect to the perpendicular). This corresponds to an angle of the interface relative to the optical axis of the optical waveguide of 40°. Accordingly, the light has to impinge on the end face at an angle that is less than the critical angle of total reflection and such angles are provided in alternative refinements of the invention.

Disposing the end face of the optical waveguide section at which the light that traverses the free-radiating region is reflected or transmitted obliquely with respect to the optical axis of the optical waveguide at an angle of 60° to 67.5° advantageously ensures, on one hand, that a beam emerging from the one end face coaxially with respect to the optical axis of the optical waveguide is refracted at an angle of less than 10° with respect to the fiber axis into the adjoining optical waveguide section and can be guided with an aperture of greater than 0.275 in the downstream waveguide section. Preferably between 0.275 and 0.32.

On the other hand, it must be taken into account that the angle of the end face (light entry face) greatly influences the separation of the polarization components. The smaller the entry angle, the less the separation of the different polarization components. By contrast, with increasing angles of light incidents through to the Brewster angle, the polarization separation increases. The preferably selected angular range between 60° and 67.5° is sufficiently far from the Brewster angle: the central ray is incident on the wavelength-selective filter at an angle of 22.5° to 30°. The polarization separation is, thereby, minimized.

In accordance with a further feature of the invention, the end face of the optical waveguide section from which light that is to be coupled out emerges forms an at least partly peripheral chamfer radially subsequent to the region running perpendicularly to the optical axis of the optical waveguide. In such a case, the chamfer, preferably, runs at least partly at the same angle with respect to the optical axis of the optical waveguide and the end face of the adjoining optical waveguide section. As such, the end faces of the adjoining waveguide sections can form, at their edge, oblique faces bearing precisely on one another and be fitted directly on one another, a wedge-shaped gap, nevertheless, being present in the light-guiding region of the optical waveguide sections.

In accordance with an added feature of the invention, the end face of the optical waveguide section from which light that is to be coupled out emerges has a bevel as an alternative or in addition to a chamfer. In such a case, the bevel extends subsequent to the region running perpendicularly to the optical axis of the optical waveguide in the radial direction and in a region of the optical waveguide section into which light reflected from the other optical waveguide section is radiated.

In accordance with an additional feature of the invention, the bevel is embodied such that the light reflected from the other optical waveguide section is radiated unimpeded past the bevel. Thus, the light can be detected, and evaluated, in an unimpeded fashion by a detection unit disposed laterally with respect to the optical waveguide, for instance, a photodiode.

In accordance with yet another feature of the invention, the bevel has a mirror coating and is oriented such that the light reflected from the other optical waveguide section impinges on the mirror coating and is reflected again at the latter. In such a case, the bevel is oriented such that the light reflected from the mirror coating emerges, or, given an opposite beam path, enters into the configuration, at an angle of about 90° with respect to the optical axis of the optical waveguide. This is achieved by virtue of the fact that the bevel is oriented in a mirror-inverted manner with respect to the beveled end face of the optical waveguide section at which the light is first reflected. The light is, thus, coupled in or out perpendicularly and a transmitting or receiving device can, accordingly, be disposed perpendicularly to the axis of the optical waveguide.

At the same time, it is ensured on account of the mirroring of the light at two interacting areas that light which is not reflected at the beveled end face of the one optical waveguide section (on account of a different wavelength), but, rather, is coupled into the optical waveguide section, impinges on the beveled end face at an angle less than the acceptance angle. This ensures that this light is guided further with a high degree of coupling-in in the optical waveguide section.

In accordance with yet a further feature of the invention, an end face of only one optical waveguide section of two adjoining ones of the at least two optical waveguide sections is coated with the wavelength-selective filter.

In accordance with yet an added feature of the invention, the end face of the only one optical waveguide section is coated with the wavelength-selective filter.

In accordance with yet an additional feature of the invention, the end face of the one optical waveguide section that runs obliquely with respect to the optical axis of the optical waveguide is coated with a wavelength-selective filter. By contrast, the end face of the other optical waveguide section that runs perpendicularly to the optical axis of the optical waveguide is not coated with a wavelength-selective filter. The light beam, thus, emerges from the end face of the one optical waveguide section, crosses the free-radiating region, and impinges, at the facing end face of the adjoining optical waveguide section, on the wavelength-selective filter disposed there.

Such a filter configuration is advantageous because, in the case of a light beam emerging from glass, a wavelength-selective filter on the exit face separates the perpendicular and parallel polarization to a greater extent than in the case of an opposite transition from air to glass. Consequently, the filter is, preferably, disposed on the end face from which the light coming from the free-radiating region is incident.

The interruption of the wave guiding that is brought about by the free-radiating region leads to beam widening and a reduction of the coupling efficiency that can be obtained with respect to the subsequent waveguide section. These should be minimized, however. It is, therefore, expedient, on one hand, for the air gap through which radiation passes to be given the smallest possible dimensions. For such a purpose, the width of the air gap, preferably, lies in the region of about 100 $\mu$m. A small gap width enables the beam widening of the coupled-out light beam to be kept small.

On the other hand, to minimize the beam widening, the numerical aperture of the optical waveguide section from which light that is to be coupled out emerges is, preferably, 0.1. This is achieved if the coupled-out light has single-mode quality. To have such a property, the optical waveguide section from which the light that is to be coupled out emerges is, preferably, a single-mode optical fiber or a multimode optical fiber with a graded index profile. The latter is the case particularly if a plurality of waveguide sections are disposed one behind the other. The single-mode properties of the light are preserved when the light is coupled over from a single-mode optical fiber into a multimode optical fiber with a graded index profile or when the light is coupled over from a multimode optical fiber with a graded index profile into a further multimode optical fiber with a graded index profile because the light is guided in a multimode optical fiber with a graded index profile like in a single-mode fiber. Accordingly, it may be provided that the optical waveguide core increases in size from a first optical waveguide section to an adjacent optical waveguide section.

After traversing the free-radiating region, the light impinges on the adjoining, beveled optical waveguide section at an angle that is less than the acceptance angle of the optical waveguide section. Due to the sudden change in refractive index in the optical waveguide, only beams up to a specific acceptance angle with respect to the optical axis of the optical waveguide can be guided in the optical waveguide section. Accordingly, the light beam that has passed through the wavelength-selective filter must be radiated onto the beveled optical waveguide section at an angle that is less than the acceptance angle of the optical waveguide section. For such a purpose, in one refinement, the waveguide section into which the light that has radiated through the filter enters is a graded index fiber having a core diameter of greater than 50 $\mu$m, in particular, 62.5 $\mu$m. In another refinement, the waveguide section into which the light that has radiated through the free-radiating region (and the filter) enters is a stepped index fiber having a numerical aperture of greater than 0.275. What is important in this case is, on one hand, that the core diameter is large enough to be able to completely capture the widened light, and that, on the other hand, the aperture is large enough that the light can also be coupled in.

In accordance with again another feature of the invention, the optical waveguide sections are in each case disposed in a ferrule, e.g., made of glass or ceramic. In such a case, use is made of glass ferrules that are transparent to light of the wavelengths used, if the light that is to be coupled in or out radiates through the respective ferrule. That will not generally be the case, however, on account of the use of a gap between adjoining optical waveguide sections. The glass ferrules provide a reliable retention and guidance of the optical waveguide sections.

In accordance with again a further feature of the invention, there is used a small mounting tube, which receives the individual glass ferrules and the optical waveguide sections disposed therein and positions them axially with respect to one another. The small mounting tube, preferably, has a longitudinal slot, the glass ferrules being embraced resiliently. In such a case, tolerances of the internal diameter of the small tube can be compensated for by the spring action so that only the tolerances of the external diameters of the glass ferrules have an effect.

In accordance with again an added feature of the invention, there is provided a plurality of optical waveguide sections, each having a beveled end face, are disposed one behind the other in the direction of the optical axis of the optical waveguide or optical waveguide sections. In such a case, the configuration according to the invention has properties of a module because different transmitting or receiving elements that are to be coupled to the configuration can be disposed arbitrarily one behind the other and can, thus, be extended, in particular, to form a multiplex/demultiplex configuration in which a plurality of transmitting and/or receiver components are disposed one behind the other. In such a case, the beveled end faces of the individual optical waveguide sections are coated with wavelength-selective filters for different wavelengths so that a data channel is in each case coupled in or out at each boundary region between two adjoining optical waveguide sections.

With the objects of the invention in view, there is also provided a electro-optical module for at least one of transmitting and receiving optical signals of at least two optical data channels, including an optical waveguide carrying the at least two optical data channels, at least one of at least one transmitting component coupling transmitting light into the optical waveguide and at least one receiving component coupling received light out from the optical waveguide, and a configuration coupling the optical signals of the at least two optical data channels at least one of into and out of the optical waveguide having at least two optical waveguide sections disposed axially one behind another along an optical axis, the at least two optical waveguide sections each having core regions disposed one behind another with respect to the optical axis and separated from one another on the optical axis by a free-radiating region, and at least one of the at least two optical waveguide sections having an end face running obliquely with respect to the optical axis, the end face being coated with a wavelength-selective filter and reflecting light for a given optical data channel one of before and after traversing the free-radiating region to thereby couple the light of the given optical data channel at least one of into and out of the at least one optical waveguide section.

The invention also relates to an electro-optical module for transmitting and/or receiving optical signals of at least two optical data channels that are carried in an optical waveguide, having at least one transmitting component, whose light is coupled into the optical waveguide, and/or at least one receiving component, which receives light coupled out of the optical waveguide. In such a case, the optical signals are coupled into and/or out of the optical waveguide by a configuration for coupling optical signals of at least one optical data channel into and/or out of an optical waveguide which carries optical signals of at least two optical data channels as set forth herein.

The transmitting and receiving components used may be, in principle, arbitrary components of this type. By way of example, the transmitting or receiving components are in each case disposed in a transistor outline ("TO") housing. It may equally be provided that they are disposed in a housing, which can be fixed on a printed circuit board.

Other features that are considered as characteristic for the invention are set forth in the appended claims.

Although the invention is illustrated and described herein as embodied in a configuration for coupling optical signals of at least one optical data channel into and/or out of an optical waveguide, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Referring now to the figures of the drawings in detail and first, particularly to FIGS. 1a to 1c, 2, and 3a to 3b thereof, there is shown a first exemplary embodiment of a configuration in which optical signals of an optical data channel are coupled into or out of an optical waveguide, the optical waveguide carrying signals of at least two optical data channels.

The configuration has a small waveguide tube 1, in which two adjoining optical waveguide sections 2, 3 of an optical waveguide are disposed. In this case, the two optical waveguide sections 2, 3 form the optical waveguide. Each of the optical waveguide sections 2, 3 includes a light-transmissive precision pin (ferrule) 4, 5 made of glass or ceramic with a central hole in which an optical waveguide 6, 8 is respectively disposed. The optical waveguides 6, 8 are, preferably, optical fibers. The two optical fibers 6, 8 have a common axis 7 with respect to which they are disposed coaxially in the small waveguide tube 1.

Strictly speaking, only that part of the optical waveguide that is disposed in a ferrule 4, 5 constitutes an optical waveguide section. To avoid long-winded passages, however, hereinafter the term optical waveguide section also denotes the actual optical waveguide 6, 8 together with the ferrule 2, 3 surrounding the latter.

Figure 1A:
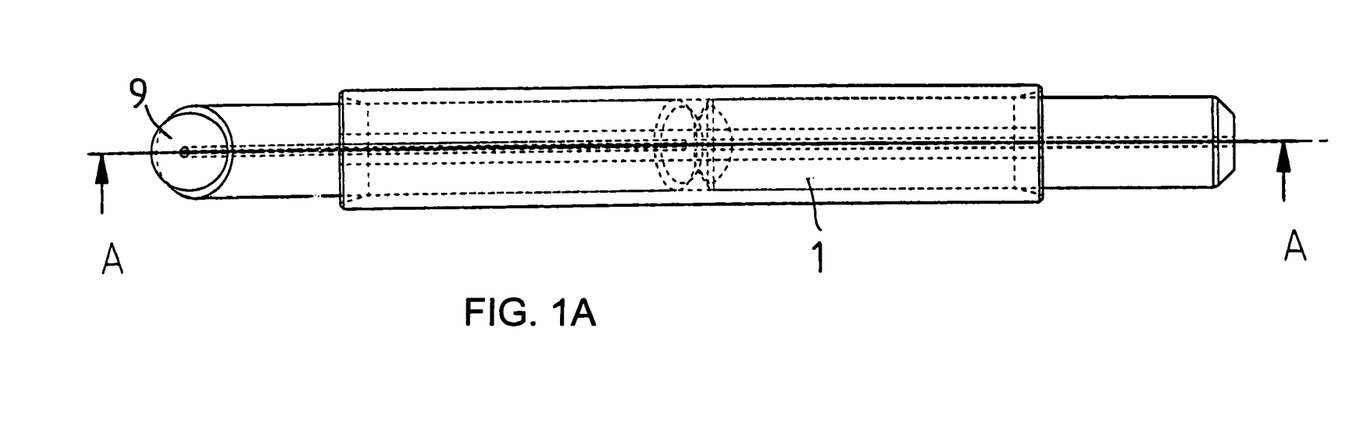
FIG. 1a is a partially hidden plan view of a configuration for coupling optical signals into and/or out of an optical waveguide with two optical waveguide sections separated from one another by an air gap according to the invention.
Figure 1B:
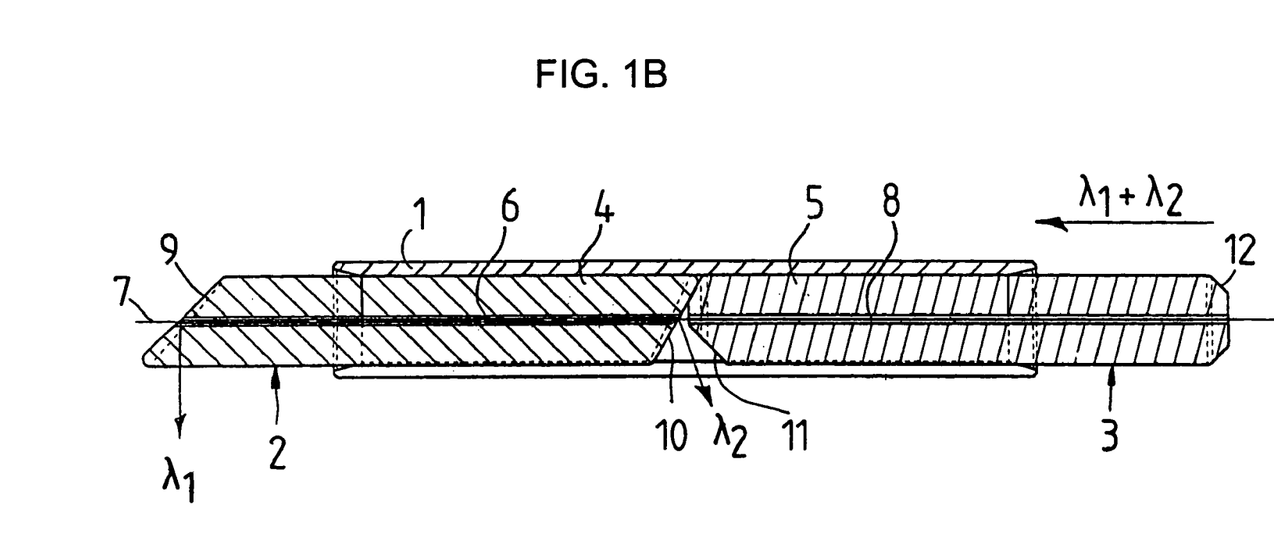
FIG. 1b is a cross-sectional view through the configuration of FIG. 1a parallel to the optical axis of the optical waveguide along line A—A.
Figure 1C:
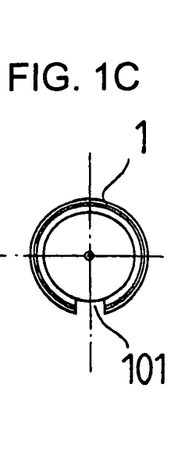
FIG. 1c is a cross-sectional view through the configuration of FIG. 1a perpendicular to the optical axis of the optical waveguide.

In accordance with FIG. 1c, the small waveguide tube 1 is not formed in a closed fashion, but rather has a longitudinal gap 101 that is oriented such that the light that is to be coupled into or out of the optical waveguide can pass through the gap 101.

At its two ends, the left-hand waveguide section 2 in each case has an end face 9, 10 running obliquely with respect to the optical axis 7. For reasons that will be explained later, the left-hand end face 9 remote from the right-hand waveguide section 3 in this case has an angle of about 45° with respect to the optical axis 7. The right-hand end face 10 facing the right-hand optical waveguide section 3 has an angle of between 60° and 67° with respect to the optical axis 7.

It is pointed out that the angular configuration of the end faces 9, 10, in particular, the angular configuration of the end face 10 facing the other optical waveguide section 3, is in no way restricted to the region of the ferrule 4, rather, a bevel of the end face 10 is present precisely in the region of the optical fiber 6. In practice, ferrule 4 and optical fiber 6 are jointly polished obliquely for this purpose.

The right-hand optical waveguide section 3, likewise, has a respective end face 11, 12 at its two ends. The precise configuration of these end faces 11, 12 is illustrated in greater detail in FIG. 2.

Figure 2:
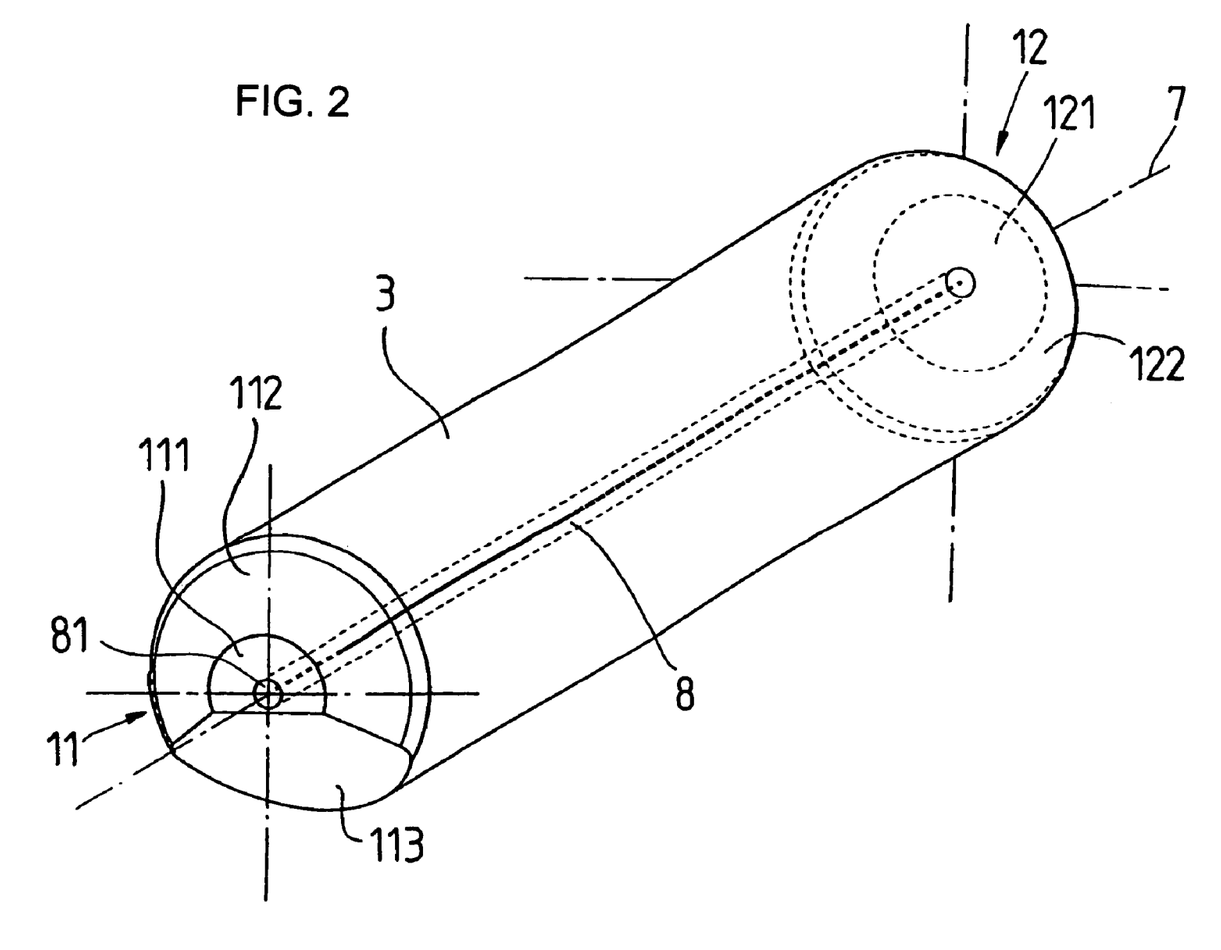
FIG. 2 is a partially hidden perspective view of one optical waveguide section of FIGS. 1a to 1c.

In accordance with FIG. 2, the waveguide section 3 forms a total of three regions at one end face 11 of the section 3. The first region is a central region 111, which integrates the end face 81 of the corresponding optical waveguide 8 and is formed perpendicular to the optical axis 7 of the optical waveguide. The central region 111 running perpendicularly to the longitudinal axis 8 is followed radially by a partly peripheral chamfer 112. In such a case, the chamfer 112 has the same orientation with respect to the optical axis 7 of the configuration at the end face 10 of the other optical waveguide section 2 so that the respective end faces bear directly on one another in a region of the chamfer 112 in accordance with FIGS. 1b and 3a.

Finally, the end face 11 of the right-hand optical waveguide section 3 has an additional bevel 113 in the lower region, which bevel is taken close to the optical waveguide 8 and bounds the partly peripheral chamfer 112. As can be gathered from FIG. 1b, for example, the bevel 113 is in this case situated in such a region of the end face 11 of the optical waveguide section 3 into which light reflected from the end face 10 of the adjoining optical waveguide section 2 is radiated. This will be explained in more detail with reference to FIG. 3b.

The other end face 12 of the optical waveguide section 3 likewise has a region 121 (made larger, however) that runs perpendicularly to the optical axis 7 and is followed radially by a peripheral chamfer 122.

Figure 3A:
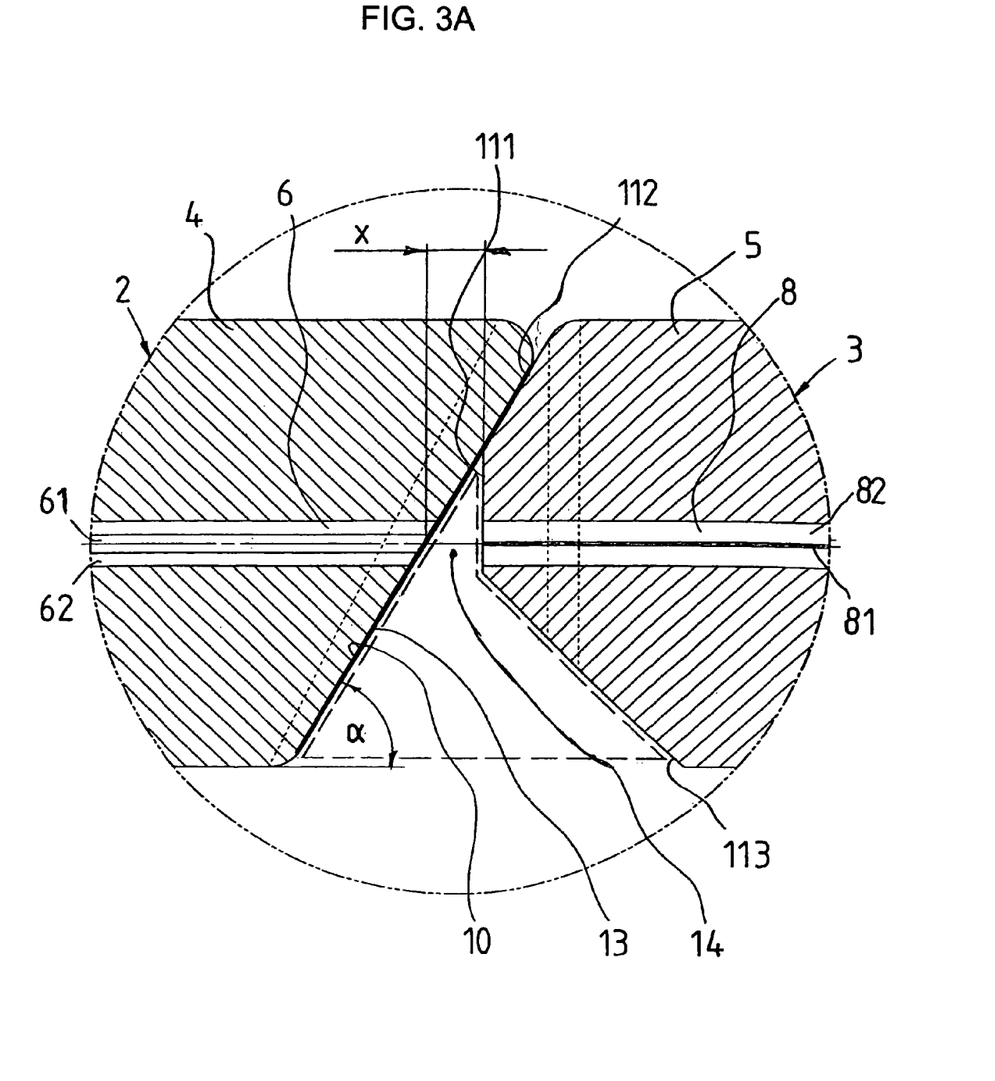
FIG. 3a is an enlarged cross-sectional view of a coupling region of the configuration of FIGS. 1a to 1c.

FIG. 3a shows the coupling region between the mutually adjoining optical waveguide sections 2, 3 in an enlarged illustration.

It is pointed out that the optical waveguides 6, 8 in each case have a light-guiding core region 61, 81 adjoined by a fiber cladding 62, 82. The right-hand optical waveguide 8 is a monomode fiber having a very small light-guiding core 81. The optical waveguide 6 of the other optical waveguide section 2 is, preferably, a multimode fiber with a graded index profile. In the case of a plurality of optical fiber sections being strung together, the one (the right-hand) optical fiber section may, likewise, be configured as a multimode fiber with a graded index profile. What is important in this case is that, in the fiber section in which the light that is to be coupled out of the fiber is transported, the light is contained as far as possible with single-mode quality so that only a small beam widening occurs after emergence from the optical waveguide section 3.

Figure 3B:
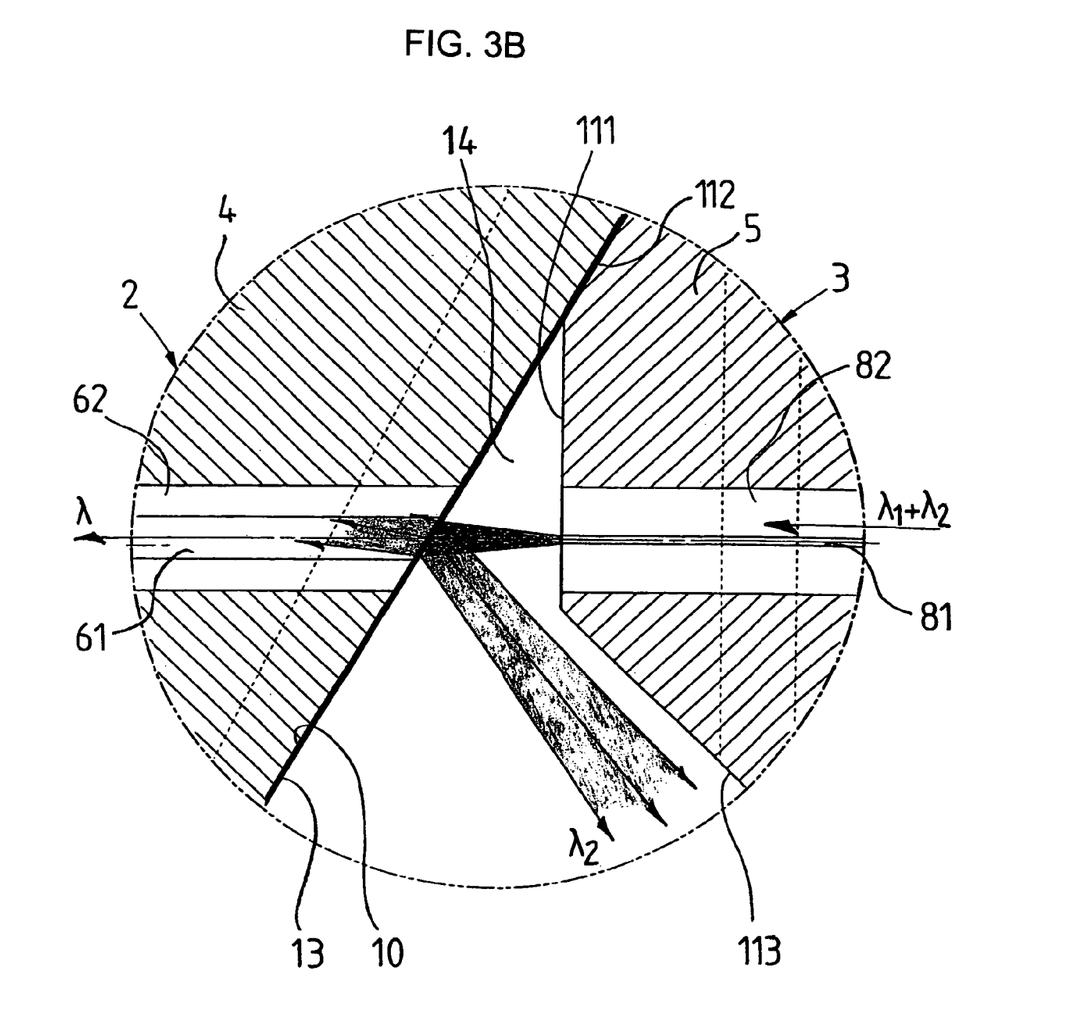
FIG. 3b is an enlarged cross-sectional view of the coupling region of the configuration of FIG. 3a with an illustration of a beam path.

As can be discerned in particular in FIGS. 3a and 3b, a wavelength-selective filter 13 is applied on the continuously beveled end face 10 of the one optical waveguide section 2. The filter 13 has the effect that light of a specific wavelength is reflected at the end face 10, while the filter 13 is transparent to light of other wavelengths. Such wavelength-selective filters exist in the prior art.

To enable a separation of wavelengths or data channels that have only a small spacing of, for example, 50 nm or less, the configuration of FIGS. 1 to 4 has a gap 14 between the two light-guiding regions 81, 61 of the mutually adjoining optical waveguide sections 3, 2, the gap 14 forming a free-radiating region between the respective optical waveguides 6, 8. The gap is automatically provided by the special configuration of the end face 11 of the right-hand optical waveguide section 3 with a partly peripheral chamfer 112. In such a case, the distance X of the free-radiating region 14 between the two optical waveguides 6, 8 can be set in a simple manner by way of a change in the radial extent of the chamfer 112.

The angle α between the end face 10 of the optical waveguide section 2 and the optical axis 7 is, preferably, 60 to 67°, as already mentioned.

The method of operation of the configuration will now be explained, in particular, with reference to FIGS. 1b and 3b. Light of two wavelengths λ1, λ2 is coupled into the right-hand optical waveguide section 3 and propagates in the direction of the left-hand end face 11 of the optical waveguide section 3. At the perpendicular end face 111 of the optical waveguide section 3, the light emerges from the core 81 of the optical fiber 8 and enters into the free-radiating region 14 between the end face 111 and the end face 10 of the adjoining optical waveguide section 2. The light experiences beam widening in this case. So that the latter is kept as small as possible, the numerical aperture of the optical waveguide 8 of the right-hand optical waveguide section 3 is, preferably, 0.1. This is made possible by using light with a single-mode property.

The radial size of the chamfer 112 applied peripherally by polishing at the waveguide section 3 is also accorded considerable importance in the case of the beam widening because the dimensions of the chamfer 112 directly control the gap width X and, thus, the beam widening and size of the light spot on the optical fiber 6 of the adjoining waveguide section 2.

The light radiated from the end face 111, after radiating through the free-radiating region 14, impinges on the oblique end face 10 of the adjoining waveguide section 2, on which the wavelength-selective filter 13 is situated. The wavelength-selective filter 13 separates the two wavelengths λ1, λ2 or channels, the light of one wavelength λ1 radiating through the filter, being refracted toward the perpendicular and being coupled into the adjoining optical fiber 6. In such a case, the core 61 of the optical fiber 6 of the waveguide section 2 has a numerical aperture of greater than 0.275 so that the light is coupled in to the greatest possible extent.

The coupled-in light is guided further in the optical waveguide section 2 and fed to a receiver. For such a purpose, the coupled-in light is deflected downward, for example, in accordance with FIG. 1b at the left-hand end face 7, which is mirror-coated, and is coupled out perpendicularly from the glass ferrule 4. However, the light of wavelength λ1 can also be detected in another way.

What is significant is that the light of wavelength λ2, which is reflected at the wavelength-selective filter 13, is reflected downward with an angle corresponding to the angle of incidence. In such a case, the angle of reflection depends on the polished angle α of the end face 10. The angle used for α from 60° to 67° ensures that the reflected light and also the transmitted light have only little polarization dependence. This is important because the light that is guided in the optical waveguides and received is not oriented geometrically in terms of its direction of polarization or fluctuates statistically. With higher angles of reflection, the polarization dependence increases.

The bevel 113 serves to ensure that the reflected light of wavelength λ2 can be radiated without obstruction past the waveguide section 3. The light is, then, detected, and evaluated, by a detector disposed laterally (transversely) with respect to the longitudinal axis 7 of the optical waveguide, for example, a photodiode.

Figure 4:
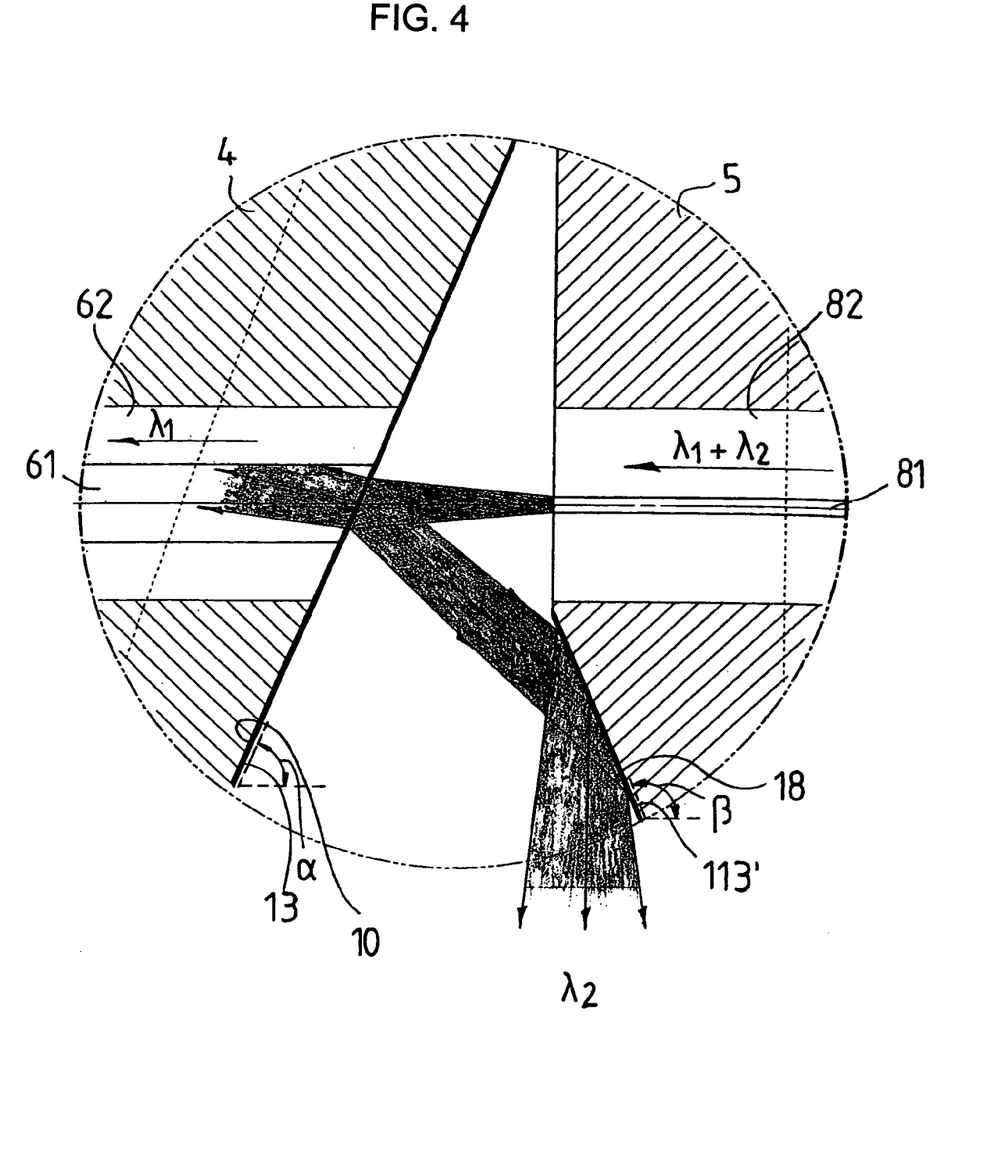
FIG. 4 is an enlarged cross-sectional view of the coupling region of an alternative configuration to FIGS. 1a to 1c and 3a with a second reflective area and an illustration of the beam path.

FIG. 4 shows an alternative configuration of a configuration for coupling light into or out of an optical waveguide, which differs from the embodiment of FIGS. 1 to 3b merely through the configuration of the bevel 113 of the end face 11 of one optical waveguide section 3.

In such an exemplary embodiment, the bevel 113' is formed less obliquely so that the light reflected from the filter 13 is not radiated past the waveguide section 3, but, rather, is incident on the bevel 113'. The bevel 113' is provided with a reflective layer 18 so that the light of wavelength λ2 that is incident on the bevel is reflected again.

It is now provided that the two end faces or end face regions 10, 113' are oriented in a mirror-inverted manner with respect to one another. The angle β illustrated in FIG. 4 is equal to 180°–α. What is thereby achieved is that, on account of the double deflection at the filter 13 and the reflective layer 18, the light of wavelength λ2 is deflected, and coupled out, precisely perpendicularly to the longitudinal axis 7 of the optical waveguide configuration. A detector can, thus, be disposed perpendicularly to the longitudinal axis 7 of the configuration in a manner that is simple to adjust, for example, in the plane of the mounting board.

Because the radiation paths are reversible, the configurations described can also be used to couple light from a transmitting component into the optical waveguide, and to realize combinations of light coupling-in and light coupling-out, for instance, in the case of bidirectional data traffic. In the case of light coupling-in, the light from a transmitting component that is to be coupled in is focused onto the core of the optical waveguide section 8 by the wavelength-selective filter 13 or the chamfered bevel 113'.

The configuration illustrated in the preceding figures, thus, represents a basic building block of a kind of module that enables the realization of a wide diversity of possibilities for the coupling-in and coupling-out and transmission of light signals of a plurality of wavelengths in an optical waveguide. By way of example, it may be provided that a plurality of optical waveguide sections are disposed one behind the other in the direction of the optical axis of the optical waveguide, light being coupled in or out in each case through a beveled end face of an optical waveguide section so that a plurality of wavelengths can be successively coupled into and/or out of an optical waveguide. Diverse possibilities for multiplexing/demultiplexing optical signals of different wavelengths can be realized as required.

Figure 5:
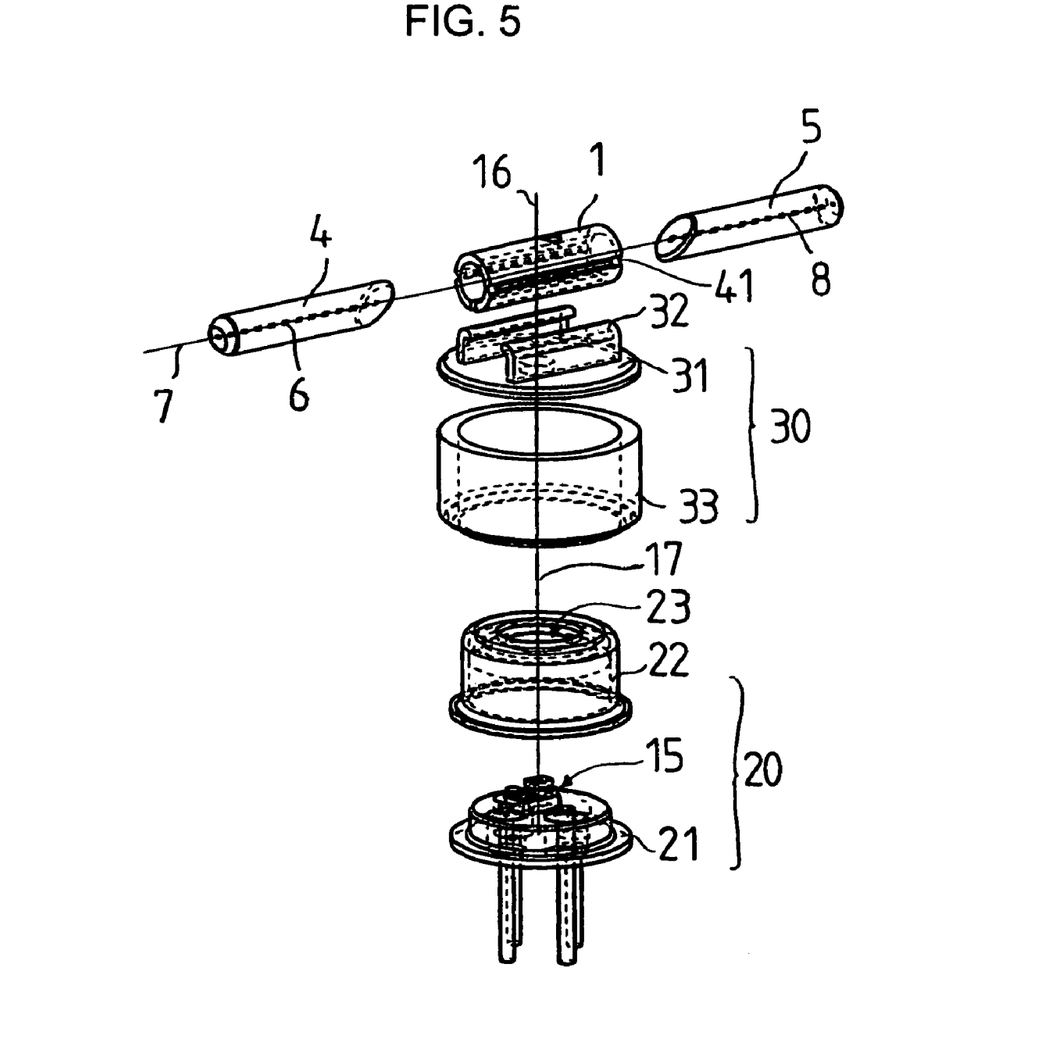
FIG. 5 is a partially hidden exploded perspective view of a first application of the configuration of FIGS. 1 to 4 in conjunction with a TO module.
Figure 6A:
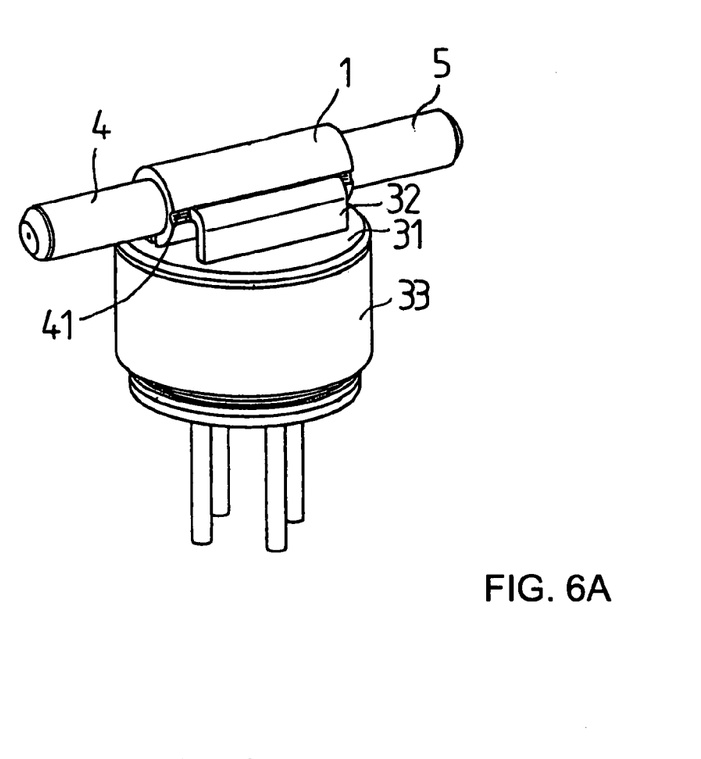
FIG. 6a is a perspective view of the assembled configuration of FIG. 5.
Figure 6B:
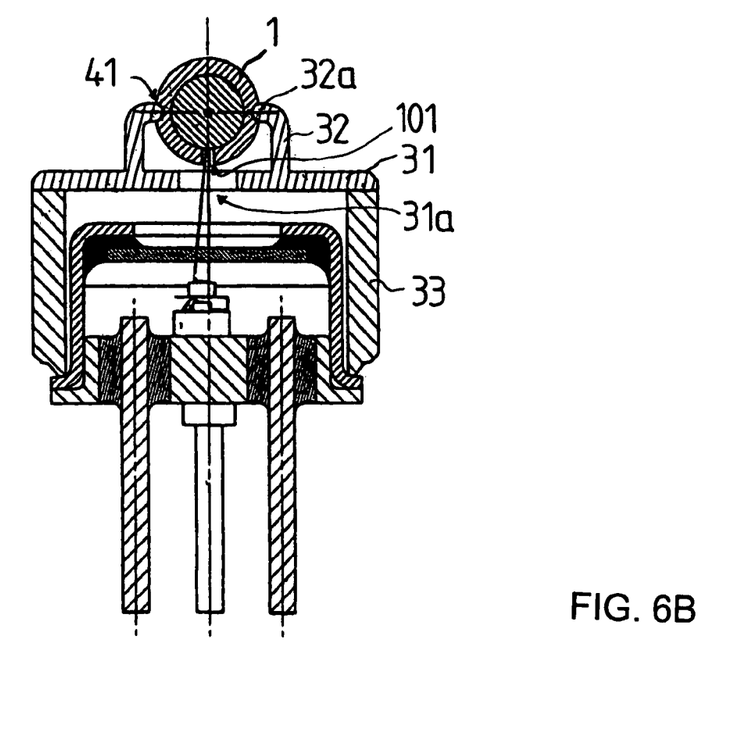
FIG. 6b is a cross-sectional view through the configuration of FIG. 6a transverse to the optical axis of the optical waveguide.

FIGS. 5 and 6a, 6b diagrammatically show a first application of a configuration in accordance with FIGS. 1 to 4, in which a coupling between a transmitting or receiving component and an optical waveguide is effected for a specific wavelength.

The configuration has a transmitting or receiving component 15, for example, a laser diode or a photodiode, which is disposed in a TO housing 20. The TO housing 20 is held in a connection or mounting housing 30, which has a holding plate 31 with holding elements 32 for fixing a small mounting tube 1 in accordance with the small mounting tube 1 of FIGS. 1a to 1c. As described above, the small mounting tube 1 receives two optical waveguide sections 6, 8 that are respectively fixed in a glass ferrule 4, 5. In such a case, the respective end faces are illustrated only diagrammatically in FIG. 5 and, actually, have a configuration as described above with reference to FIGS. 1 to 4.

In the exemplary embodiment illustrated, the transmitting or receiving component 15 is a laser diode, which is disposed in a conventional manner on a carrier, preferably, composed of silicon. Light emitted by the laser diode 15 is deflected onto a coupling lens through a deflection prism and radiated upward by the lens.

The TO housing 20 has a baseplate 21 with four electrical bushings that serve for the electrical contact connection of the laser chip 15 and a monitor diode. The TO housing, furthermore, has a housing part 22, which forms a window 23 at its top side so that light from the laser diode 15 is radiated upward or, if the configuration is configured fundamentally identically in construction as a receiving unit, light for detection can be incident on a receiving component. TO housings exist in the prior art.

The connection housing 30 has a cylindrical receptacle part 33 and the holding or mounting plate 31 already mentioned. In such a case, the receptacle part 33 serves for receiving the TO housing 20. The holding plate 31, which, likewise, has a window 31a in accordance with FIG. 6b, has two longitudinally extending holding elements 32 that are spaced apart and are opposite one another and whose upper ends are bent over and form guide areas 32a. The holding elements 32 serve for receiving the small mounting tube 1 (also referred to as a "split sleeve"), which has two diametrically opposite longitudinal grooves 41 corresponding to the receptacle areas 32a. The small mounting tube 1 can be pushed onto the holding elements 32 in a simple manner free from play.

The small mounting tube 1 has a continuous longitudinal gap or slot 101, which is oriented with respect to the holding plate such that it points perpendicularly downward and, consequently, light emitted by the transmission diode 15 can radiate through it.

The small mounting tube 1 provided with the longitudinal slot 101 exerts a slight spring force on the glass ferrules 4, 5, tolerances of the internal diameter of the small mounting tube 1 being compensated for.

The optical axis 7 of the optical waveguide runs substantially perpendicularly to the axis 17 of symmetry of the TO housing.

Figures 7, 8:
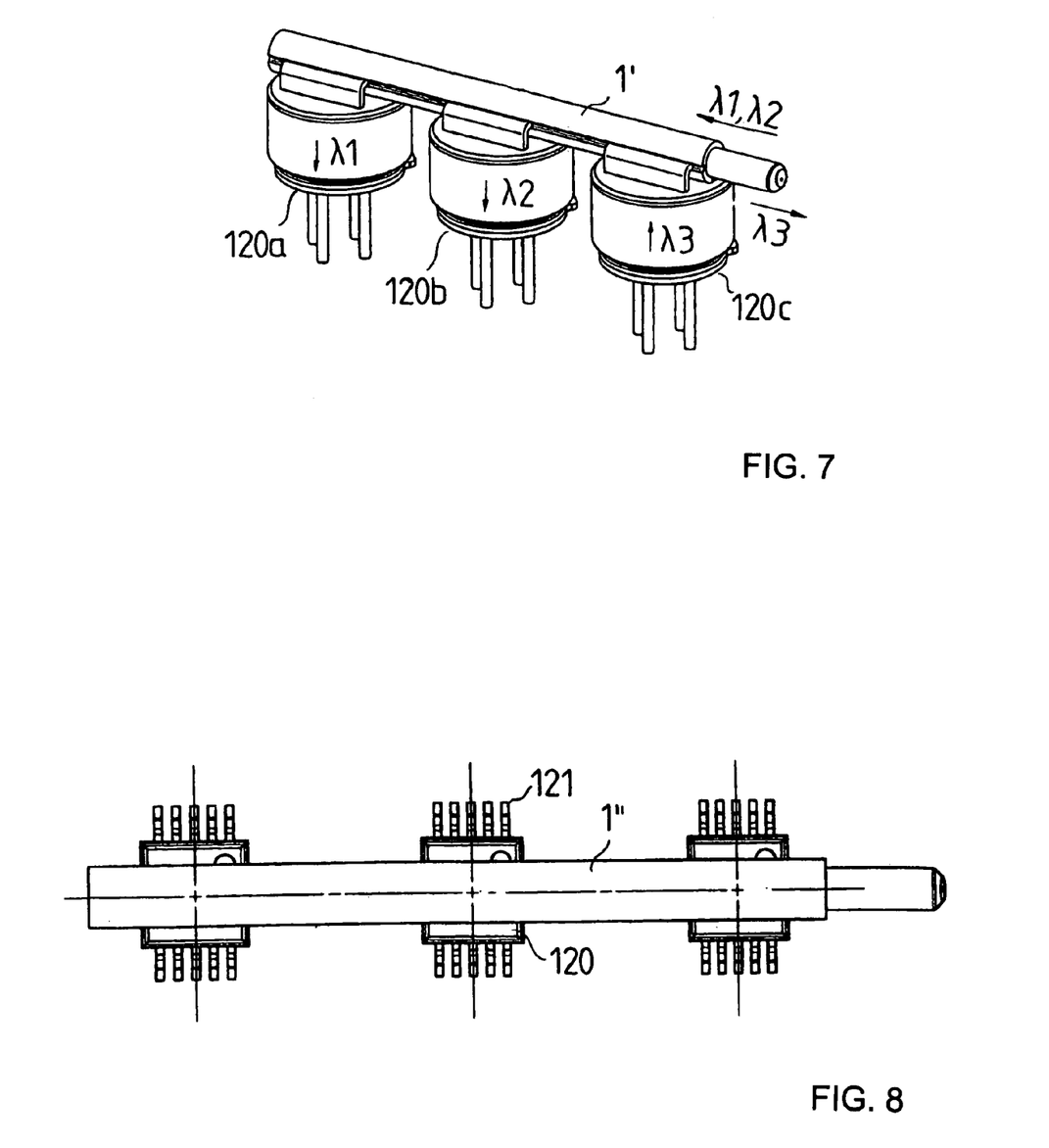
FIG. 7 is a perspective view of a second application of the configuration of FIGS. 1 to 4 in conjunction with three transmitting and/or receiving components disposed one behind the other and respectively disposed in a TO housing.
FIG. 8 is a plan view of a third application of the configuration of FIGS. 1 to 4 in conjunction with three transmitting and/or receiving components disposed one behind the other directly on a printed circuit board.

FIG. 7 illustrates a further exemplary embodiment, in which a plurality of waveguide sections are used, in the manner mentioned above, for coupling in a wavelength and coupling out two further wavelengths (so-called tri-port bidirectional component). In this case, there are situated in a continuous small mounting tube 1' three optical waveguide sections with end faces corresponding to FIGS. 1 to 4, at which light of a different wavelength $\lambda 1, \lambda 2, \lambda 3$ in each case is coupled in or out. The optical waveguide sections are mounted on assigned TO modules 120a, 120b, 120c. By way of example, the right-hand TO module 120c couples light of a wavelength $\lambda 3$ into the optical waveguide and the two other TO modules 120a, 120b couple light of two further wavelengths $\lambda 1, \lambda 2$ out of the optical waveguide, as indicated diagrammatically.

The wavelength $\lambda 1$ lies in the range of 1550–1560 nm, the wavelength $\lambda 2$ lies in the range of 1480–1500 nm, and the wavelength $\lambda 3$ is about 1300 nm.

The three optical waveguide sections disposed in the small mounting tube 1' are, for example, one after the other, a single-mode fiber, a graded index fiber having a core diameter of 50 $\mu$m, and a graded index fiber having a core diameter of 62.5 $\lambda$m. Such a configuration ensures that the light coupled into a new optical waveguide section is also guided with single-mode quality there as far as possible.

FIG. 8 shows an exemplary embodiment in which the transmitting or receiving component (not illustrated separately) is not disposed in a TO housing, but, rather, in a semiconductor housing 120 illustrated diagrammatically. The semiconductor housing 120 accommodates a non-illustrated carrier for the transmitting or receiving component and a contact connection 121, through which the transmitting or receiving component can be connected to a printed circuit board 123.

A plurality of optical waveguide sections in accordance with FIGS. 1 to 5 are, again, formed in a preferably continuous small mounting tube 1". The small mounting tube 1" is fixed on the semiconductor housings 120 in a manner similar to FIG. 5 (not illustrated). For the passage of light, the semiconductor housings in each case have a light exit opening at their side facing the small mounting tube 1".

The method of operation of the configuration is the same as in the case of the configurations described above so that reference is made to the explanations in this regard.

We claim:

1. A configuration for coupling optical signals of at least one optical data channel at least one of into and out of an optical waveguide carrying optical signals of at least two optical data channels, comprising:

at least two optical waveguide sections disposed axially one behind another along an optical axis, said at least two optical waveguide sections each having core regions disposed one behind another with respect to said optical axis and separated from one another on said optical axis by a free-radiating region;

at least a first one of said at least two optical waveguide sections having an end face at which light to be coupled at least one of out or in is reflected, said end face running obliquely with respect to said optical axis, said end face:

being coated with a wavelength-selective filter; and passing light for a given optical data channel through said free-radiating region and reflecting the light for the given optical data channel before or after passing through said free radiating region, to thereby couple the light of the given optical data channel at least one of into and out of a second one of said at least two optical waveguide sections; and at least said second one of said at least two optical waveguide sections having an end face at least one of from which light to be coupled out emerges or onto which light to be coupled in is reflected, said end face running at least partly perpendicular to said optical axis.

2. The configuration according to claim 1, wherein adjoining ones of said at least two optical waveguide sections have adjoining end faces defining said free-radiating region as a wedge-shaped air gap therebetween.

3. The configuration according to claim 1, wherein said free-radiating region is a wedge-shaped air gap.

4. The configuration according to claim 1, wherein said end face disposed obliquely with respect to said optical axis is disposed at an angle of between approximately 60° and approximately 67.5° with respect to said optical axis.

5. The configuration according to claim 1, wherein said end face disposed obliquely with respect to said optical axis is disposed at an angle of between approximately 60° and approximately 67.5° with respect to said optical axis.

6. The configuration according to claim 1, wherein an end face of only one optical waveguide section of two adjoining ones of said at least two optical waveguide sections is coated with said wavelength-selective filter.

7. The configuration according to claim 1, wherein said end face disposed obliquely with respect to said optical axis of said at least one optical waveguide section is coated with said wavelength-selective filter.

8. The configuration according to claim 1, wherein an end face of only one optical waveguide section is coated with said wavelength-selective filter.

9. The configuration according to claim 1, wherein said at least one optical waveguide section from which light to be coupled out emerges is one of a single-mode optical fiber and a multimode optical fiber with a graded index profile.

10. The configuration according to claim 1, wherein said core regions each have an optical waveguide core increasing in size from one of said at least two optical waveguide sections to an adjacent other one of said at least two optical waveguide sections.

11. The configuration according to claim 1, wherein one of said at least two optical waveguide sections into which light enters after traversing said free-radiating region has a numerical aperture of between approximately 0.275 and approximately 0.32.

12. The configuration according to claim 1, including ferrules, each of said at least two optical waveguide sections being disposed in a respective one of said ferrules.

13. The configuration according to claim 12, including a mounting tube receiving said ferrules and said at least two optical waveguide sections disposed therein, said mounting tube axially positioning said ferrules and said at least two optical waveguide sections with respect to one another.

14. The configuration according to claim 13, wherein:
said ferrules are of glass; and
said mounting tube has a longitudinal slot and resiliently embraces said glass ferrules.

15. The configuration according to claim 1, wherein said at least two optical waveguide sections is a plurality of optical waveguide sections each having a beveled end face, said plurality of optical waveguide sections disposed one behind another in a direction of said optical axis.

16. The configuration according to claim 1, wherein:
an end face of only one optical waveguide section of two adjoining ones of said at least two optical waveguide sections is coated with said wavelength-selective filter;
said end faces of said at least two optical waveguide sections are beveled; and
individual ones of said beveled end faces of said at least two optical waveguide sections are coated with wavelength-selective filters for different wavelengths, each wavelength-selective filter being associated with one of the at least two optical data channels.

17. A configuration for coupling optical signals of at least one optical data channel at least one of into and out of an optical waveguide carrying optical signals of at least two optical data channels, comprising:
at least two optical waveguide sections disposed axially one behind another along an optical axis, said at least two optical waveguide sections each having core regions disposed one behind another with respect to said optical axis and separated from one another on said optical axis by a free-radiating region;
at least a first one of said at least two optical waveguide sections having an end face running obliquely with respect to said optical axis, said end face:
being coated with a wavelength-selective filter; and
passing light for a given optical data channel through said free-radiating region and reflecting the light for the given optical data channel before or after passing through said free radiating region, to thereby couple the light of the given optical data channel at least one of into and out of a second one of said at least two optical waveguide sections; and
at least said second one of said at least two optical waveguide sections having an end face at least one of from which light to be coupled out emerges or onto which light to be coupled in is reflected, said end face running at least partly perpendicular to said optical axis and having:
a region disposed at least partly perpendicular to said optical axis; and
an at least partly peripheral chamfer radially subsequent to said region.

18. The configuration according to claim 17, wherein:
an optical waveguide section adjoining said at least one optical waveguide section from which light to be coupled out emerges has a second end face disposed at a given angle with respect to said optical axis; and
said chamfer runs at least partly at said given angle.

19. The configuration according to claim 17, wherein said end face of an optical waveguide section running obliquely with respect to said optical axis is coated with said wavelength-selective filter.

20. The configuration according to claim 17, wherein said at least one optical waveguide section from which light to be coupled out emerges has a numerical aperture of approximately 0.1.

21. A configuration for coupling optical signals of at least one optical data channel at least one of into and out of an optical waveguide carrying optical signals of at least two optical data channels, comprising:
at least two optical waveguide sections disposed axially one behind another along an optical axis, said at least two optical waveguide sections each having core regions disposed one behind another with respect to said optical axis and separated from one another on said optical axis by a free-radiating region;
at least a first one of said at least two optical waveguide sections having an end face running obliquely with respect to said optical axis, said end face:
being coated with a wavelength-selective filter; and
passing light for a given optical data channel through said free-radiating region and reflecting the light for the given optical data channel before or after passing through said free radiating region, to thereby couple the light of the given optical data channel at least one of into and out of a second one of said at least two optical waveguide sections; and at least said second one of said at least two optical waveguide sections having an end face at least one of from which light to be coupled out emerges or onto which light to be coupled in is reflected, said end face running at least partly perpendicular to said optical axis and having:
- a region disposed at least partly perpendicular to said optical axis; and
- a bevel radially subsequent to said region in a region into which light reflected from another one of said at least two optical waveguide sections is radiated.

22. The configuration according to claim 21, wherein said bevel is oriented to radiate light reflected from said other one of said at least two optical waveguide sections unimpeded past said bevel.

23. The configuration according to claim 21, wherein said bevel has a mirror coating and is oriented such that light reflected from said other one of said at least two optical waveguide sections impinges on said mirror coating and is reflected again at said mirror coating.

24. The configuration according to claim 23, wherein the light reflected from said mirror coating one of emerges from and enters into the configuration at an angle of approximately 90° with respect to said optical axis.

25. The configuration according to claim 23, wherein the light reflected from said mirror coating one of emerges from and enters into at least one of said at least two optical waveguide sections at an angle of approximately 90° with respect to said optical axis.

26. An electro-optical module for at least one of transmitting and receiving optical signals of at least two optical data channels, comprising:

an optical waveguide carrying the at least two optical data channels;

at least one of:
- at least one transmitting component coupling transmitting light into said optical waveguide; and
- at least one receiving component coupling received light out from said optical waveguide; and a configuration coupling the optical signals of the at least two optical data channels at least one of into and out of said optical waveguide having:

at least two optical waveguide sections disposed axially one behind another along an optical axis, said at least two optical waveguide sections each having core regions disposed one behind another with respect to said optical axis and separated from one another on said optical axis by a free-radiating region;

at least a first one of said at least two optical waveguide sections having an end face at which light to be coupled at least one of out or in is reflected, said end face running obliquely with respect to said optical axis, said end face:
- being coated with a wavelength-selective filter; and
- passing light for a given optical data channel through said free-radiating region and reflecting the light for the given optical data channel before or after passing through said free radiating region, to thereby couple the light of the given optical data channel at least one of into and out of a second one of said at least two optical waveguide sections; and at least said second one of said at least two optical waveguide sections having an end face at least one of from which light to be coupled out emerges or onto which light to be coupled in is reflected, said end face running at least partly perpendicular to said optical axis.

27. The module according to claim 26, wherein said at least one transmitting component is disposed in a TO housing.

28. The module according to claim 26, wherein said at least one receiving component is disposed in a TO housing.

29. The module according to claim 26, wherein said at least one transmitting component is disposed in a housing to be fixed on a printed circuit board.

30. The module according to claim 29, including a printed circuit board, said housing fixed on said printed circuit board.

31. The module according to claim 26, wherein said at least one receiving component is disposed in a housing to be fixed on a printed circuit board.

32. The module according to claim 31, including a printed circuit board, said housing fixed on said printed circuit board.

* * * * *